United States Patent [19]

Kopainsky

[11] 4,449,244
[45] May 15, 1984

[54] DATA TRANSMISSION NETWORK EMPLOYING OPTICAL WAVE GUIDE

[75] Inventor: Jügen Kopainsky, Fislisbach, Switzerland

[73] Assignee: BBC Brown, Boveri & Company Limited, Switzerland

[21] Appl. No.: 354,360

[22] Filed: Mar. 3, 1982

[30] Foreign Application Priority Data

Mar. 5, 1981 [CH] Switzerland .................... 1469/81

[51] Int. Cl.³ .............................................. H04B 9/00
[52] U.S. Cl. .................... 455/603; 455/602; 455/606; 455/607; 370/3
[58] Field of Search ............... 455/602, 603, 606, 607; 370/3

[56] References Cited

U.S. PATENT DOCUMENTS

| | | | |
|---|---|---|---|
| 3,461,384 | 8/1969 | Bayati | 455/602 |
| 3,506,833 | 4/1970 | von Willisen | 455/602 |
| 4,054,834 | 10/1977 | Boirat | 455/602 |
| 4,107,519 | 8/1978 | Bicek | 455/603 |
| 4,301,543 | 11/1981 | Palmer | 455/607 |

FOREIGN PATENT DOCUMENTS 2805905 8/1979 Fed. Rep. of Germany ...... 455/602

*Primary Examiner*—Howard W. Britton
*Attorney, Agent, or Firm*—Ostrolenk, Faber, Gerb & Soffen

[57] ABSTRACT

A single main optical wave guide section is employed for carrying signals both away from circuits monitoring a high voltage transmission system and toward circuits for causing the operation of switching equipment in the high voltage line. Control circuit equipment which is remotely located from the high voltage power conductor receives and produces optical signals required for monitoring the system state and causing the operation of the protective equipment. Transmitted and received signals are isolated from one another within the single line by branching the ends of the line into two branches which deal with monitoring signals and control actuating signals, respectively. The branched optical fiber ends prevent transmission of signals from one branch to the other but permit the transmission of the signals from either branch to the main body or from the main body to either branch. The main body can be divided into as many branches as desired.

6 Claims, 2 Drawing Figures

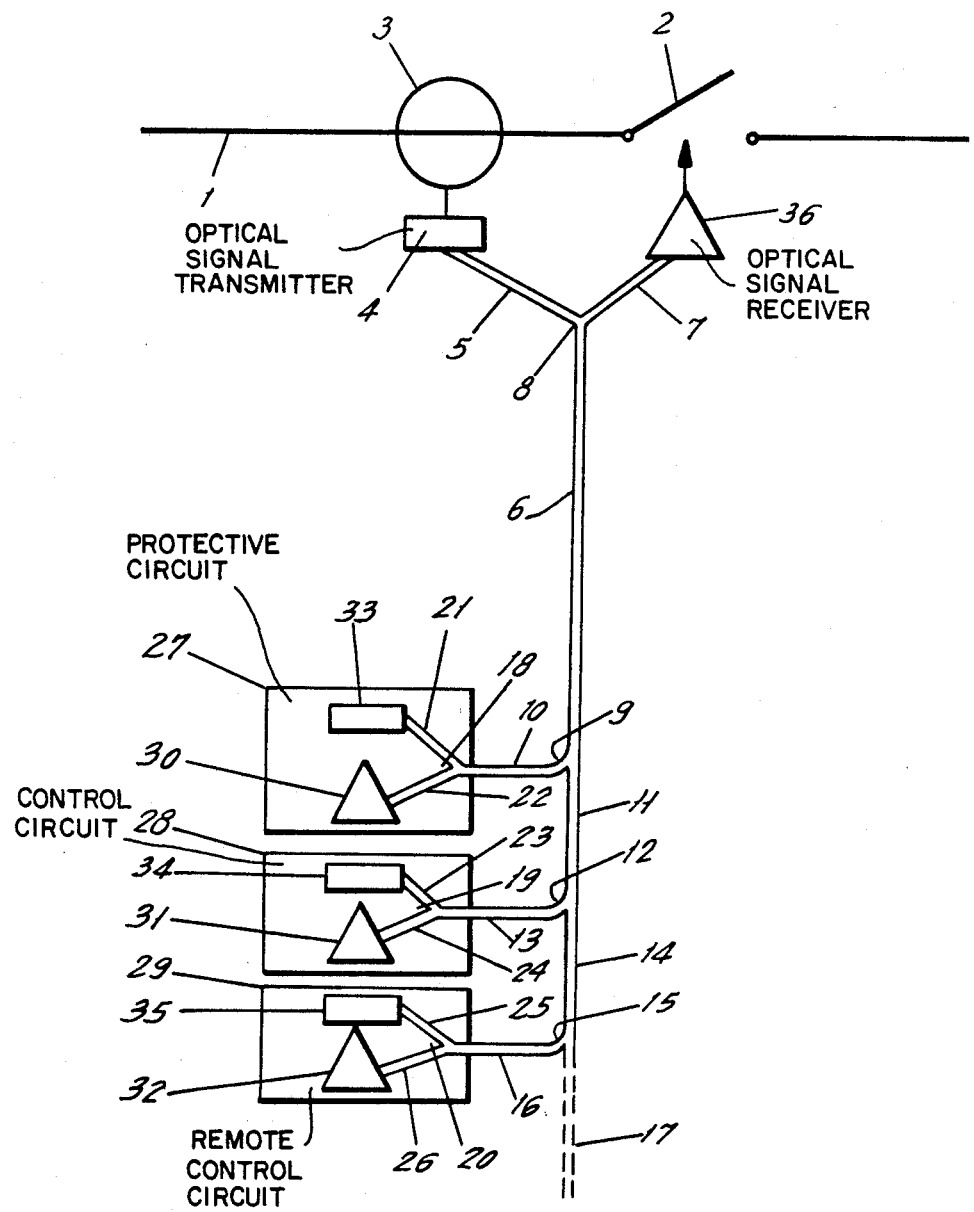
_FIG.1_

DATA TRANSMISSION NETWORK EMPLOYING OPTICAL WAVE GUIDE

BACKGROUND OF THE INVENTION

This invention relates to data transmission networks and more specifically relates to a novel data transmission network for communicating signals between apparatus being monitored and controlled and remote controlling equipment.

It is frequently desirable to employ remotely located monitoring and control circuitry for monitoring the operation of equipment and controlling its operation in response to monitored data. For example, in a high voltage electric power transmission system it is desirable to monitor the voltage and current of the system and to operate circuit switching equipment or other similar equipment in response to the measured data. All of the circuitry for handling the monitored signals and for producing appropriate control signals is preferably remotely located where it is accessible at ground level to operators and available for maintenance and the like.

It is possible to employ a first set of control wires extending from the line monitoring devices such as current transformers to the remote control circuits, and to employ a second set of control wires extending from the remote control circuits at ground level to the circuit switching devices at high voltage. These two separate circuits, however, are subject to electromagnetic interference. Moreover, if they are closely coupled to one another, they can interfere with the operation of one another. It is also known to produce monitoring signals as a modulated light beam and carry the monitor signals from the equipment being monitored to the ground location over a first optical wave guide. Control signals produced at ground can be converted to modulated light signals and carried to controls for the equipment being monitored by a second optical wave guide. While this avoids possible electromagnetic interference, it requires two duplicate and separate optical paths.

The use of such fiber optic systems in data transmission networks is described in "THE USE OF FIBER OPTICS FOR COMMUNICATIONS, MEASUREMENT AND CONTROL WITHIN HIGH VOLTAGE SUBSTATIONS" by D. C. Erickson, IEEE TRANSACTIONS ON POWER APPARATUS AND SYSTEMS, VOL. PAS-99, NO. 3, (1980), pp. 1057 et seq.

BRIEF DESCRIPTION OF THE PRESENT INVENTION

In accordance with the present invention remotely located control circuitry is coupled to the equipment being monitored by a single elongated optical wave guide which is branched at its two ends. At one end, a first light path branch is coupled to the monitoring equipment and a second light path branch is coupled to the actuating equipment. At the other end of the system, a first light path branch leads to signal processing circuits and a second light path branch is coupled to optical signal generator means which produces signals for operating the actuating equipment in response to the outputs of the signal processing circuits. The branched junctions of the wave guide are arranged in a manner such that optical signals cannot be transmitted from one branch to the other although the signals can be transmitted from either branch to the main single body of the wave guide or from the single body of the wave guide to any one branch.

Glass fiber branching for optical data conductors is known, and is described in the article "GLASS FIBER BRANCHING FOR A DATA BUS" by J. J. Schmid et al in Bull. SEV/VSE 70, (August 1979), pp. 818 to 821. By employing such equipment in the novel network, it is possible to prevent "cross-talk" between the actuator control signals and the monitoring control signals while permitting the main length of the optical wave guide to be formed of a single wave guide, thus contributing substantially to the economy and reliability of the system.

While one end of the transmission wave guide is forked, it will be understood that this end could be continued to other branched junctions. The signals conducted in each of the pairs of branched junctions will also be effectively isolated from one another.

As a further feature of the invention, a branched optical fiber system can be employed to serve a signal splitting function so that a single monitor such as a single current transformer coil disposed relative to power equipment being monitored can produce a single optical signal which can be conducted to a branched junction and then to separate circuit function control elements and measuring elements. Note that two separate cores were required in the past for current transformers to produce two signals for monitoring and control purposes respectively.

While the invention is particularly applicable to the control and monitoring of a high voltage power conductor, the invention can be applied to any equipment which requires separate monitoring and control functions wherein monitoring the control signals must be conducted in first and second channels respectively and where the control signals are responsive to the monitored data and are produced at a location remote from the equipment location.

BRIEF DESCRIPTION OF THE DRAWINGS

FIG. 1 is a schematic diagram showing the manner in which the invention is applied to a high voltage switching system.

DETAILED DESCRIPTION OF THE DRAWINGS

Figure 2:
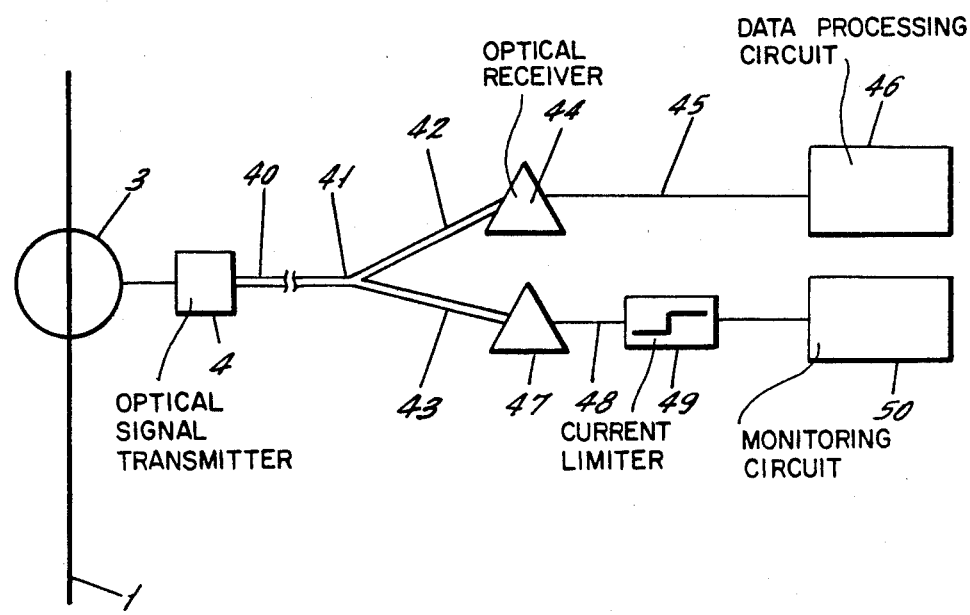
FIG. 2 shows a second embodiment of the invention and illustrates the manner in which the branched junction wave guide can split a signal produced by a single current transformer into two channels for monitoring and control purposes, respectively.

Referring first to FIG. 1, there is schematically illustrated a high voltage power conductor 1 which can be opened by an appropriate switch or circuit breaker 2. Conductor 1 is surrounded by a current transformer secondary winding 3. Note that the current transformer winding 3 could be a potential transformer or any other kind of voltage and/or current monitor device.

The measured data acquired by current transformer 3 are converted into optical signals by a electrical to optical transducer 4 which may be of any well known variety. By way of example, the current measured in the current transformer winding 3 can be employed to frequency modulate the output of a suitable light emitting diode in the transducer 4.

The optical signals produced by transducer 4 are then applied to one end of branch 5 of an optical wave guide which has a main body 6 constituting the length necessary for reaching remotely disposing control equipment which is at ground potential.

Branch 5 and a second branch 7 extend from a junction 8 at the upper end of the optical wave guide 6. The lower end of wave guide 6 has a branched junction 9 having branches 10 and 11 respectively. Junction 9 is characterized in that light from optical wave guide 6 can divide between branches 10 and 11 and further in that light traveling from branches 10 and 11 can flow into wave guide 6. However, the light of branch 10 cannot flow into branch 11 and similarly the light or optical signals in branch 11 cannot flow into branch 10. The same is true of branches 5 and 7 associated with junction 8 whereby light from the branches 5 and 7 can flow into the main body 6 and light from the main body 6 can flow into branches 5 and 7 but light from branch 5 cannot flow into branch 7 and light from branch 7 cannot flow into branch 5.

Branch 11 as shown in FIG. 1 leads to a second branched junction 12 which has branches 13 and 14 respectively which have the characteristics of the junctions 8 and 9 described such that light can flow between either of branch 13 or 14 and the main input branch section 11 but light cannot flow between branches 13 and 14. Any other desired number of branched junctions can be provided. Thus, one further branched junction 15 has branches 16 and 17 respectively having the characteristics previously described. The total number of branches is limited simply by the application need, the power which is available in the transmitting transducer 4 and by the attenuation of the system.

Each of branches 10, 13 and 16 are conducted to still further branched junctions 18, 19 and 20, respectively, which have branches 21-22, 23-24, and 25-26, respectively. Each of these pairs of branches has the same characteristics previously described in that optical signals cannot communicate between the branches of a given junction but can communicate between the main optical fiber and either of its branches.

Branched junctions 18, 19 and 20 and their respective branches are contained within different signal generating and receiving type devices such as protective circuit 27, control circuit 28 and remote control circuits 29. Each of devices 27, 28 and 29 include optical receivers 30, 31 and 32, respectively connected to branches 22, 24 and 26, respectively, and optical signal transmitters 33, 34 and 35, respectively connected to branches 21, 23 and 25, respectively.

Each of optical receivers 30, 31 and 32 are schematically illustrated but it will be understood that they may include an appropriate optical sensor which may be provided with an appropriate non-reflective and preferably black input and appropriate circuits for converting the optical signals which are received into appropriate electrical signals with subsequent amplification of those signals. For example, suitable photo-diodes can be employed followed by an amplification stage.

Each of optical signal transmitters 33, 34 and 35 include an appropriate electrical circuit which may produce an output responsive to the signals received by their respective receivers 30, 31 and 32 or to external commands. Electrical circuits associated with transmitters 33, 34 and 35 are followed by an appropriate electrical to optical transducers which apply appropriate signals which might be frequency modulated onto branches 21, 23 and 25, respectively. These optical signals will then be transmitted into branches 10, 13 and 16, respectively and then into the common main fiber optic body 6 toward junction 8 and branch 7 to optical signal receiver 36.

The receiver 36 can, for example, cause activation of the operating mechanism of switch 2. Thus, when an appropriate optical signal is received from branch 7, the switch 2 can be opened or closed. Note that the optical signal traveling to the junction 8 will also be applied to branch 5 but this will not interfere with the operation of the transducer 4 since transducer 4 is not a receiver.

If desired, receiver 36 may be provided with means for separating and storing or processing signals from each of transmitters 33, 34 and 35. By way of example, each of transmitters 33, 34 and 35 may be assigned a discrete frequency band which is selectively received through appropriate filters, or semi-permeable mirrors, at receiver 36 and stored in suitable respective signal accumulators for subsequent signal processing at receiver 36. Note that semi-permeable mirrors can also be connected at the regions between the light transmitters and the light guides which will permit light to enter the guides from the transmitters, but prevent reflected light from entering the transmitters.

The operation of the device of FIG. 1 is now described. The current flow in power conductor 1 is monitored by current transformer 3 which applies a signal to transducer 4 related to current in conductor 1. Transducer 4 converts the electrical signal from current transformer 3 into an optical signal which is frequency modulated to contain the instantaneous current flow data in conductor 1. This optical signal is applied to the end of branch 5 and from branch 5 to main fiber optic body 6. Note that the signal generated in transducer will not be applied to branch 7 because of the nature of junction 8.

The optical signal in main body 6 is then conducted to suitable control circuits 27, 28 and 29 for appropriate metering and control of switch 2 and other remote apparatus whose operation is to be coordinated with the measured current in conductor 1. For example, if a fault occurs in the power conductor 1, the current transformer winding 3 produces a corresponding output signal which is applied to the transducer 4. The optical signal produced by the transducer 4 which is representative of the fault current in the line 1 is conducted through branch 5 of the optical wave guide into the main body 6 of the wave guide and then into branches 10, 13 and 16. The circuit which is responsive to fault conditions is the circuit 27 and the optical fault signal on branch 10 is conducted via branch 22 to receiver 30. The optical fault signal is appropriately processed by circuit 27 and a tripping command may be produced by the transmitter 33 if the circuit 27 determines that the fault must be cleared.

The tripping command is communicated as an optical signal by transmitter 33 over the branch 21 through branch 10 and upwardly through main optical fiber 6 to branch 7 and to the receiver 36. Receiver 36 converts the optical command to an electrical control signal and causes the actuation of the switching device 2.

It was previously noted that the production of the fault signal by transducer 4 will not directly affect the receiver 36 since the signal from branch 5 cannot flow directly into branch 7. Similarly, the signal produced by transmitter 33 cannot flow into either branch 22 or into branch 11 but can only flow into branch 10 and then into the main conduit 6. Consequently, the production of the tripping signal by transmitter 33 cannot interfere with any of the functions of circuits 28 and 29. In a similar manner, the control outputs of transmitters 34 and 35 will be communicated only to the receiver 36 without interfering with one another or with the equipment of circuit 27.

Consequently, by arranging the optical wave guides as shown in FIG. 1, it is possible to obtain non-reflective control and data transmission and distribution without requiring complicated electrical networks or plural optical paths between the equipment being controlled and the control station for the various kinds of signals which are to be transmitted between the two.

FIG. 2 shows a second embodiment of the invention wherein the novel branched junction wave guide is employed to serve the function of signal splitting in a high voltage system and permits use of a single current transformer core for producing signals for both a monitoring and a controlling function. FIG. 2 shows the high voltage power conductor 1 of FIG. 1 with the current transformer secondary winding 3 and transducer 4 which produces optical signals related to the electrical data monitored by the current transformer 3.

The optical output of transducer 4 in FIG. 2 is applied to a main wave guide link 40 which has a branched junction 41 at its end. The branched junction 41 leads to branches 42 and 43 which are arranged such that optical signals in the branches cannot be exchanged between branches 42 and 43 but can only be applied to and from the main body 40.

Branch 42 is then connected to an appropriate optical receiver and transducer 44. Transducer 44 converts the optical signal into an electrical output which is applied to electrical circuit 45 to a suitable data processing circuit 46. Circuit 46 develops appropriate signals which are applied to and control protective devices, Branch 43 is connected to optical receiver and transducer 47. The electrical output of transducer 47 is connected over the electrical line 48, for example through a current limiting element 49, to an appropriate monitoring circuit 50. Current limiting component 49 produces a sharp signal change in response to a short circuit current which precisely identifies the short circuit current condition so that an interruption procedure can be immediately started.

The operation of the system of FIG. 2 is as follows. All measured values which are acquired by current transformer 3 are converted into suitable optical signals by the transducer 4 and are applied to the main fiber body 40. The optical signal is then divided into branches 42 and 43 and then to their respective receivers 44 and 47. The electrical outputs of receivers 44 and 47 are then electrically connected to circuits 46 and 50 which then carry out their control functions. The appropriate control signals produced by circuits 46 and 50 may then be retransmitted back to the transducer 4 to carry out the necessary control or adjustment function of the two circuits.

Note that the control optical signals which travel back over branches 42 and 43 wil not interfere with one another since these signals cannot flow from one branch into the other but can only flow into the main branch 40. As a consequence, only a single current transformer core and winding 3 is needed for production of signals for the two circuits 46 and 50. In the past, two separate current transformer windings and cores were required to ensure isolation of the signals which were applied to and received from the individual circuits 46 and 50 which exercise protection and metering functions, respectively. The present invention permits a single current transformer winding and a single signal path 40 to the remotely located equipment including components 44-50.

The signals which are transmitted over the optical wave guides disclosed can be either digital signals or analog signals. If analog signal transmission is used in FIG. 2, the current limiting component 49 can be a saturable coil whereas, in the case of digital transmission, the current limiting function can be carried out by component 49 in a numerical fashion. The use of the novel system of FIG. 2 permits a reduction in the size of the protection core of transformer 3 as compared to that of a conventional system while still meeting the dynamic prerequisites for device protection and the high accuracy required for the current metering. This is a consequence of the reduced burden on the current transformer whose output signals are converted into optical signals.

While the invention is described in FIGS. 1 and 2 as applied to signals produced by a current transformer, it will be understood that it is also possible to incorporate a voltage transformer into the data transmission network. Moreover, it will be understood by those skilled in the art that the invention is not limited to application to high power, high voltage electrical systems but can generally be applied generally to data transmission and monitoring of signals and control of equipment from remotely located areas.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A data transmission network for transmitting control and operating signals between electrical apparatus and remotely disposed control means for said electrical apparatus; said network including measurement transducer means and actuator means connected to said apparatus for producing, respectively, electrical output signals representative of an operating parameter of said apparatus and operating signals for modifying the operation of said apparatus, first and second optical signal transmitters connected to said measurement transducer means and said control means respectively for transmitting signals related respectively to said operating parameter and for modifying the operation of said apparatus; first and second optical receivers connected to said actuator means and control means respectively, and optical wave guide means having a main length and first and second ends each having first and second branches extending from first and second junctions respectively; the ends of said first and second branches of said first junction of said wave guide being coupled to said first optical signal transmitter and said first optical receiver respectively; the ends of said first and second branches of said second junction of said wave guide being coupled respectively to a third branch which extends to supplemental control locations and to a third junction; said third junction having fourth and fifth branches connected to said second optical signal transmitter and said second optical receiver respectively; said branched ends of said wave guide permitting transmission of optical signals between either of said second or third junction with said first junction and preventing communication between branches extending from a common junction.

2. The data transmission network of claim 1 which further includes a plurality of branched junctions connected to said third branch; one branch of each of said branched junctions having a further respective branched junction, producing a plurality of branches extending from said main length; the ends of each of the pairs of said plurality of branches terminating on an optical signal transmitter and an optical signal receiver respectively, said branched junctions having a structure which permits communication of optical signals only between said main length and any of said plurality of branches but prevents communication of optical signals between two branches of any of said plurality of branched junctions.

3. The data transmission network of claim 1 wherein said electrical apparatus is a high voltage switching device, and said measurement transducer means is at least one of an instrument transformer or a status transducer which monitors an electrical parameter of said switching device.

4. The data transmission network of claim 1 wherein said measurement transducer is a current transformer.

5. The data transmission network of claim 2 wherein each of said optical signal transmitters associated with said control means has a respective identifiable frequency; said first optical receiver including frequency discrimination means for selectively identifying the signal of any one of said optical signal transmitters associated with said control means.

6. The data transmission network of claims 1, 2 or 5 which further includes discrete frequency band selective means disposed between at east selected ones of said optical transmitters and said branch of said wave guide coupled thereto; said discrete frequency band selective means permitting transmitted light to enter said wave guide while preventing reflected light from entering said optical transmitters associated with said discrete frequency band selective means.

* * * * *